(12) United States Patent
Caritu et al.

(10) Patent No.: US 9,021,712 B2
(45) Date of Patent: May 5, 2015

(54) AUTONOMOUS SYSTEM AND METHOD FOR DETERMINING INFORMATION REPRESENTATIVE OF THE MOVEMENT OF AN ARTICULATED CHAIN

(75) Inventors: Yanis Caritu, St J. la Riviere (FR); Christelle Godin, Brignoud (FR)

(73) Assignee: Commissariat a l'energie Atomique et aux energies Aternatives, Paris (FR)

( * ) Notice: Subject to any disclaimer, the term of this patent is extended or adjusted under 35 U.S.C. 154(b) by 657 days.

(21) Appl. No.: 13/001,358

(22) PCT Filed: Jun. 24, 2009

(86) PCT No.: PCT/EP2009/057930
§ 371 (c)(1),
(2), (4) Date: Mar. 28, 2011

(87) PCT Pub. No.: WO2010/003824
PCT Pub. Date: Jan. 14, 2010

(65) Prior Publication Data
US 2011/0173831 A1    Jul. 21, 2011

(30) Foreign Application Priority Data

Jun. 27, 2008  (FR) .................................. 08 03635

(51) Int. Cl.
*B25J 9/16*     (2006.01)
*G01B 5/004*    (2006.01)
*B25J 5/00*     (2006.01)

(52) U.S. Cl.
CPC *B25J 9/1615* (2013.01); *B25J 5/00* (2013.01); *B25J 9/162* (2013.01)

(58) Field of Classification Search
USPC ........................................ 33/511, 512, 503
See application file for complete search history.

(56) References Cited

U.S. PATENT DOCUMENTS 5,611,147 A * 3/1997 Raab .............................. 33/503
6,539,336 B1 * 3/2003 Vock et al. ................... 702/182
(Continued)

FOREIGN PATENT DOCUMENTS

EP    1 649 985 A    4/2006
EP    1 721 593 A    11/2006

OTHER PUBLICATIONS

International Search Report from PCT/EP2009/057930, issued Mar. 10, 2010.
(Continued)

*Primary Examiner* — Yaritza Guadalupe-McCall
(74) *Attorney, Agent, or Firm* — Stroock & Stroock & Lavan LLP

(57) ABSTRACT

The invention relates to an autonomous system for determining items of information representative of the movement of an articulated chain (CA__1, CA__2, CA__3) comprising at least two solid elements (ES1__1, ES2__1, ES1__2, ES2__2, ES3__2, ES1__3, ES2__3, ES3__3, ES4__3) and at least one articulation (ART1__1, ART1__2, ART2__2, ART1__3, ART2__3, ART3__3) connecting said two elements. The system comprises at least two devices (DISP1__1, DISP2__1, DISP1__2, DISP2__2, DISP3__2, DISP1__3, DISP2__3, DISP3__3, DISP4__3) for measuring inter-device distances, mounted fixedly on two distinct elements of said articulated chain and suitable for transmitting the measurements made. Moreover, the system comprises means for determining at least one distance separating two measuring devices based on at least one measurement supplied by a measuring device, and calculation means (CALC), mounted on said articulated chain, suitable for calculating items of information representative of the movement of said articulated chain based on the measurements transmitted by said devices for measuring inter-device distances.

17 Claims, 3 Drawing Sheets

(56) References Cited

U.S. PATENT DOCUMENTS

| | | | |
|---|---|---|---|
| 6,941,239 B2* | 9/2005 | Unuma et al. | 702/141 |
| 6,959,259 B2* | 10/2005 | Vock et al. | 702/142 |
| 7,051,447 B2* | 5/2006 | Kikuchi et al. | 33/503 |
| 7,296,363 B2* | 11/2007 | Danisch et al. | 33/556 |
| 7,334,472 B2* | 2/2008 | Seo et al. | 73/379.01 |
| 7,387,611 B2* | 6/2008 | Inoue et al. | 600/595 |
| 7,431,707 B2* | 10/2008 | Ikeuchi | 602/16 |
| 7,552,021 B2* | 6/2009 | Bar-Haim et al. | 702/97 |
| 7,653,508 B1* | 1/2010 | Kahn et al. | 702/160 |
| 7,711,516 B2* | 5/2010 | Caritu et al. | 702/153 |
| 8,301,575 B2* | 10/2012 | Bonnet et al. | 706/12 |
| 8,516,711 B2* | 8/2013 | Pettersson | 33/503 |
| 8,627,576 B2* | 1/2014 | Engel | 33/503 |
| 2003/0109258 A1* | 6/2003 | Mantyjarvi et al. | 455/440 |
| 2005/0033200 A1* | 2/2005 | Soehren et al. | 600/595 |
| 2006/0020177 A1* | 1/2006 | Seo et al. | 600/300 |
| 2006/0130594 A1 | 6/2006 | Ikeuchi | |
| 2009/0030345 A1* | 1/2009 | Bonnet et al. | 600/587 |
| 2011/0173831 A1* | 7/2011 | Caritu et al. | 33/700 |
| 2011/0298709 A1* | 12/2011 | Vaganov | 345/158 |
| 2012/0053890 A1* | 3/2012 | Van Acht et al. | 702/151 |
| 2012/0191408 A1* | 7/2012 | Godin et al. | 702/150 |
| 2012/0260512 A1* | 10/2012 | Kretschmer et al. | 33/503 |
| 2012/0283856 A1* | 11/2012 | Caritu et al. | 700/91 |
| 2012/0319940 A1* | 12/2012 | Bress et al. | 345/156 |

OTHER PUBLICATIONS

Written Opinion of the International Searching Authority from PCT/EP2009/057930, issued Mar. 10, 2010.

* cited by examiner

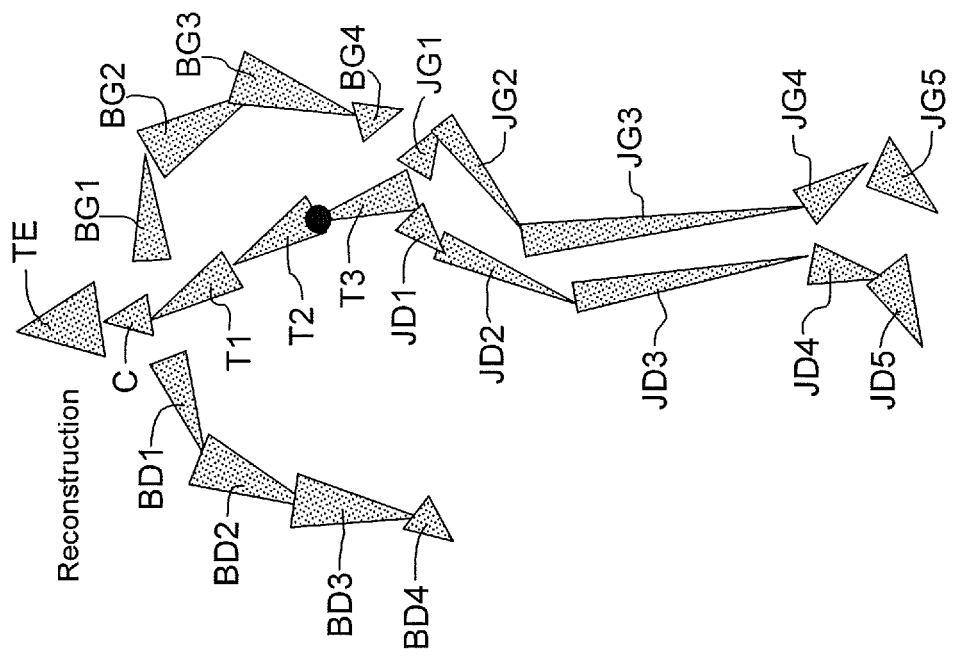
FIG.4c Reconstruction
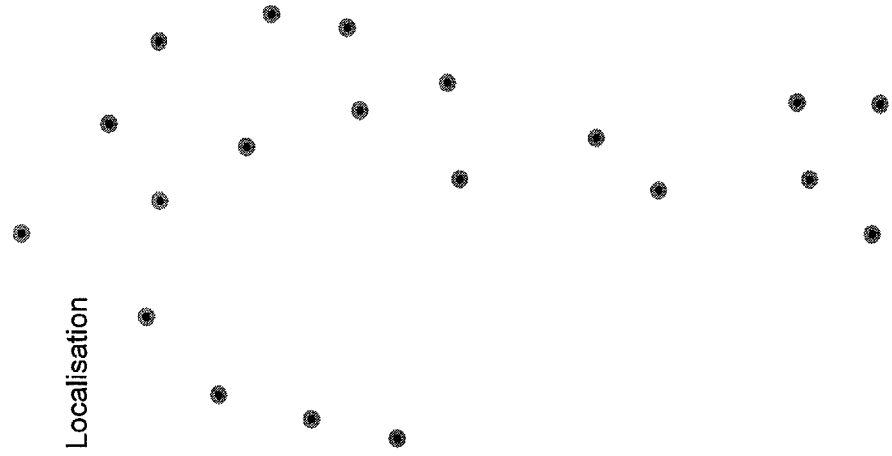
FIG.4b Localisation
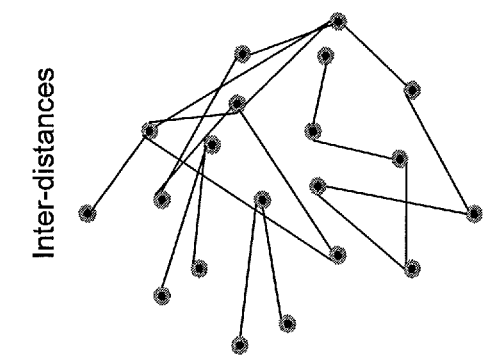
FIG.4a Inter-distances

AUTONOMOUS SYSTEM AND METHOD FOR DETERMINING INFORMATION REPRESENTATIVE OF THE MOVEMENT OF AN ARTICULATED CHAIN

This application is a national phase application under §371 of PCT/EP2009/057930, filed Jun. 24, 2009, which claims priority to French Patent Application No. 0803635, filed Jun. 27, 2008, the entire content of which is expressly incorporated herein by reference.

FIELD OF THE INVENTION

The invention relates to an autonomous system and method for determining items of information representative of the movement of an articulated chain.

BACKGROUND OF THE INVENTION

Capturing movement of an articulated chain, such as a robot or a human, is a technique used in many applications, for example biomechanical analysis, remote manipulation, animation of virtual people, or man-machine interfaces by gesture in which the articulated chain is usually an upper limb comprising an arm, a forearm and a hand.

There are devices comprising two distinct portions, one placed on a moving object, the other fixed relative to the movement of the object. This type of device requires installing material both on the object and in the environment of the object, which causes problems if obstacles are present between these various materials, and limits the scope of such a device. The installation and calibration time is long and the cost is high.

There are also very widespread devices, based on optics, as described for example in documents US 2003/0215130 A1 and US 2005/00883333 A1, making it possible to reconstruct the movements of the body based on images seen by cameras placed all around the movement sequence of the body. Highly visible markers are placed on the moving object. A process carried out by a computer tool makes it possible to determine the position in three dimensions, or 3D, of each marker through the principle of stereoscopy. However, the problems of optical occlusion remain numerous which makes the minimum number of cameras used high.

Certain authors propose to reduce this type of drawback, as appears, for example, in the document "Skeleton-Based Motion Capture for Robust Reconstruction of Human Motion" (L. Herda; P. Fua; R. Plänkers; R. Boulic; D. Thalmann, Computer Graph lab (LIG), EPFL—web 01/2000). Other authors propose processing methods based on the silhouette extracted from a single camera by associating therewith a model of the moving object, for example in the document "Marker-free Kinematic Skeleton Estimation from Sequences of Volume Data" (C. Theobalt; E. Aguiar; M. Magnor; H. Theisel; H-P. Seidel; MPI Informatik).

However, even though these drawbacks are reduced, they remain.

The systems based on electromagnetism reconstruct the angles and the positions of the sensors placed on the object.

The ultrasound systems, like the optical systems, find the positions of the emitters. These two technologies suffer from the same limitation in space as the camera-based systems.

Other devices exist in a single block, placed on the moving object or body, such as exoskeletons, which use a reconstruction of the movement based on measurements of angles taken by angle sensors placed at the articulations. These devices make it possible to dispense with the spatial limitation of the movement capture. However, these devices are constricting because they comprise mechanical articulated arms and/or legs placed on the structure or the person, which are considerably weighty and awkward.

Other devices, for example described in document FR2897680, use inertio-magnetic sensors, such as gyrometers, accelerometers, or magnetometers, and use inter-segment angle calculations or solid elements of the articulated chain which make it possible to reconstruct the complete movement of the articulated chain. It is a device that is easy to produce.

SUMMARY OF THE INVENTION

One object of the invention is to propose an alternative to the aforementioned devices which is cheaper and less complex.

According to one aspect of the invention, an autonomous system is proposed for determining items of information representative of the movement of an articulated chain comprising at least two solid elements and at least one articulation connecting said two elements, said system comprising:
at least two devices for measuring inter-device distances, mounted fixedly on at least two distinct elements of said articulated chain;
means for determining at least one distance separating two measuring devices based on at least one measurement supplied by a measuring device; and
calculation means suitable for calculating items of information representative of the movement of said articulated chain based on the distances transmitted by said distance-determination means.

Such a system is autonomous and does not suffer problems of optical occlusion or of visual detection of visible markers which is made difficult on the outside. Moreover, such a system has a reduced cost and its awkwardness of use is very limited.

According to one embodiment, at least one of said devices for measuring inter-device distances includes means for determining a distance separating the device in question from another device. In this case, the measurement supplied by the device is directly a distance measurement.

According to one embodiment, the means for determining at least one distance separating two measuring devices are distinct from these measuring devices. In this case, at least one of the two measuring devices must transmit a measurement (radio, optical, video or other signal) to the remote distance-determination means.

According to one embodiment, at least one of said devices for measuring inter-device distances is suitable for emitting and/or receiving data.

This emission/reception can be used for measuring the distance as such. The distance is calculated by a mode for detecting radiofrequency pulses and for estimating time difference of arrival or TDOA or for estimating received signal strength indication or for estimating the time of arrival or TOA.

Moreover, a distance-measuring unit may advantageously receive by radio set points of the level of accuracy to be achieved. Specifically, the reconstruction of the articulated chain has a conditioning which depends on the geometric configuration itself. Therefore, it is possible to adjust this level of accuracy upward in order to improve the performance of the system, or downward in order to reduce the power consumption of the system and the cost of producing the system.

Finally, the measurement data can be transmitted directly to a nearby mobile unit capable of containing a greater computing power than that which is on board.

According to one embodiment, the system also comprises at least one accelerometer and/or one gyrometer and/or one magnetometer supplying complementary measurements used by the calculation means.

The distance measurement is a static data item while the inertia measurement, by gyrometer or accelerometer, is a dynamic data item, i.e. using parameters of order one and two of the movement, such as the angular velocity and the acceleration. These measurements are therefore very complementary for a better reconstruction of the movement. For its part, the magnetometer gives, for each point an item of inclination information relative to a fixed direction in the space, that of the earth's magnetic field.

In one embodiment, the system comprises at least one optical device for measuring inter-device distances.

Therefore, the distance supplied is more accurate than that supplied by a radiofrequency device.

According to one embodiment, the system comprises storage means, mounted on said articulated chain, suitable for storing said items of information representative of the movement of said articulated chain delivered by said calculation means or for directly storing said previously-determined inter-device distances.

The items of information can therefore be stored for subsequent exploitation of the movement, or for a real-time transmission to an external station exploiting the items of data representative of the movement, for example for display and/or analysis, or provided with calculation means making it possible to reconstruct the movement of the articulated chain, based on the inter-device distances.

For example, said inter-device distance measuring devices are fixedly mounted on said solid elements of said articulated chain so that, for one articulation, the sum, for all of said inter-device distance measuring devices mounted on a solid element linked to said articulation, of the distances separating a measuring device and the articulation, is maximal.

For a given number of inter-device distance measuring devices, the accuracy of the system is maximized.

For example, said inter-device distance measuring devices are mounted on said solid elements of said articulated chain so that the distances between devices placed on one and the same solid element are maximal.

For example, said articulated chain comprising at least three solid elements. One solid element of said articulated chain linked to two articulations comprises an inter-device distance measuring device placed substantially in the middle of said solid element.

This is a compromise for maximizing the distance from the two articulations to which the solid element is linked. This embodiment is particularly valuable when it is desired to have a single device per solid segment in order to limit the costs.

In one embodiment, the system comprises at least one inter-device distance measuring device per solid element of the articulated chain and per degree of freedom in rotation or in translation of an articulation linked to the solid element, said chain having no closed portion, said inter-device distance measuring devices are placed on the solid element so that the following relation is verified:

$$NEQ \geq NVAR$$

wherein:

NEQ represents the number of equations linking to the distance measurements the unknown position variables of the end of each segment moved by an articulation of the articulated chain; and NVAR represents the number of said unknown position variables.

In one embodiment, the system comprises at least one inter-device distance measuring device per solid element of the articulated chain and per degree of freedom in rotation of an articulation linked to the solid element, said measuring devices being placed on the solid element so that the vector linking the articulation to a device is linearly independent of the vector or vectors linking the articulation to the other measuring devices.

For example, the system comprises at least one solid element linked to an articulation and furnished with at least two inter-device distance measuring devices, said measuring devices being placed on said solid element so that they avoid forming a straight line with the articulation.

For example, the system comprises at least one solid element linked to an articulation and furnished with at least three inter-device distance measuring devices, said measuring devices being placed on said solid element so that they avoid forming a plane with the articulation.

Therefore, this gives a configuration that can operate irrespective of the number of degrees of freedom of the articulations, and notably when articulations of the system have three degrees of freedom in rotation.

According to one embodiment, said inter-device distance measuring devices comprise a measurable maximal threshold distance.

It is therefore possible to limit the number of data items to store and to process and to limit the power consumption of the system.

In one embodiment, the system also comprises transmission means mounted on said articulated chain in order to transmit items of information representative of the movement of said articulated chain or of the inter-device distances stored in said storage means.

It is therefore possible to transmit these items of information to an external or on-board electronic control unit capable of reconstructing the movement of the articulated chain.

According to one embodiment, said inter-device distance measuring devices and/or said calculation means, and/or said storage means, and/or said transmission means are suitable for operating on a living body considered to be said articulated chain.

The invention can be applied to a human or animal body.

According to another aspect of the invention, also proposed is a method for determining items of information representative of the movement of an articulated chain comprising at least two solid elements and at least one articulation linking said two elements, the method comprising the following steps:

fixedly mounting at least two inter-device distance measuring devices on at least two distinct solid elements of the articulated chain;

determining at least one distance separating two measuring devices based on at least one measurement supplied by a measuring device; and calculating items of information representative of the movement of said articulated chain based on the previously-determined distances.

BRIEF DESCRIPTION OF THE DRAWINGS

The invention will be better understood on studying a few embodiments described as nonlimiting examples and illustrated by the appended drawings in which:

FIGS. 4a, 4b and 4c illustrate schematically the reconstruction of the movement of an articulated chain according to one aspect of the invention.

DETAILED DESCRIPTION OF THE DRAWINGS

Figure 1:
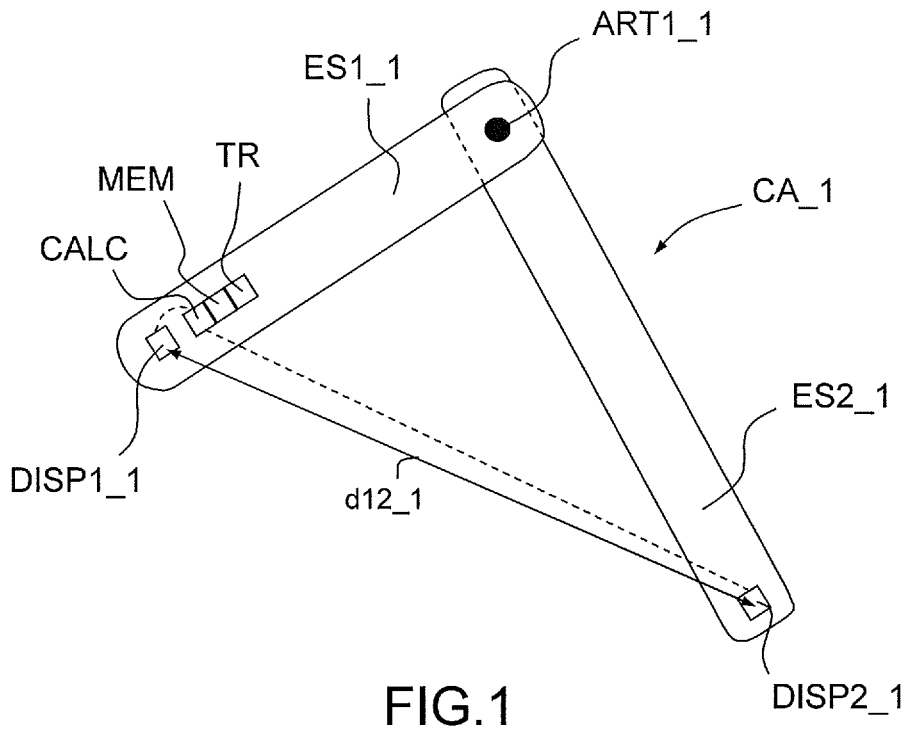
FIG. 1 illustrates schematically one embodiment of a system according to one aspect of the invention.

FIG. 1 shows a first articulated chain CA_1 furnished with an autonomous system for determining items of information representative of the movement of the articulated chain CA_1, according to one aspect of the invention. The first articulated chain CA_1 comprises two solid elements, in this instance solid segments ES1_1 and ES2_1, and a first articulation ART1_1 with one degree of freedom. As a variant, the solid elements of the articulated chain may be of any shape.

In the first articulated chain CA_1, the first solid element ES1_1 comprises a first device DISP1_1 for measuring inter-device distances, and the second solid element ES2_1 comprises a second device DISP2_1 for measuring inter-device distances.

Therefore the system makes it possible to determine the distance d12_1 separating the first and second devices DISP1_1 and DISP2_1.

The devices DISP1_1 and DISP2_1, and all of these devices described in the present patent application, may, for example, use contactless principles for determining distance, of the radio pulse or echo radar type, or by reception and calculation of the distance based on the propagation time, on the received strength, or by Doppler effect, of infrared, video or electromagnetic types.

This distance d12_1 is delivered by one of the two, or both devices DISP1_1 and DISP2_1, for example by wireless transmission, to a calculation module CALC placed on the first articulated chain CA_1. The calculation module CALC is capable of calculating items of information representative of the movement of the first articulated chain CA_1, based on the measurements transmitted by the inter-device distance measuring devices DISP1_1 and DISP2_1. These items of information may be distances separating all or a judiciously selected portion of the inter-device distances, or calculated items of information representing states of movement of the articulated chain.

For example, one of the two devices may be an emitter and the other a receiver linked to or comprising the calculation module.

Each device may be either passive or active. In the case, for example, of the systems of radar type, the emitter device is active and the other device consisting only of a reflector is passive.

These items of information can be stored in a storage module MEM and transmitted by a transmission module TR, either substantially in real time, or after the end of a movement of the first articulated chain CA_1, for example to an external electronic control unit capable, based on these items of information, of reconstructing or determining the movement of the first articulated chain CA_1. In the case of a human or of a humanoid robot, the post-processing carried out may incorporate a model making it possible to detect the placement of the feet and therefore the overall movement of a person or of a humanoid robot who or which walks or runs.

The system can be used in combination with a system making it possible to define the position of a point of the articulated chain.

In the example of FIG. 1, the two devices DISP1_1 and DISP2_1 are placed so that the sum, for all of the devices DISP1_1 and DISP2_1, of the distances separating a device DISP1_1, DISP2_1 from the articulation ART1_1 linked to the solid element ES1_1, ES2_1 on which the device DISP1_1, DISP2_1 is mounted, is maximal.

As a variant, the calculation module CALC, and/or the storage module MEM, and/or the transmission module TR may be joined to or incorporated in the inter-device distance measuring device DISP1_1.

Figure 1A:
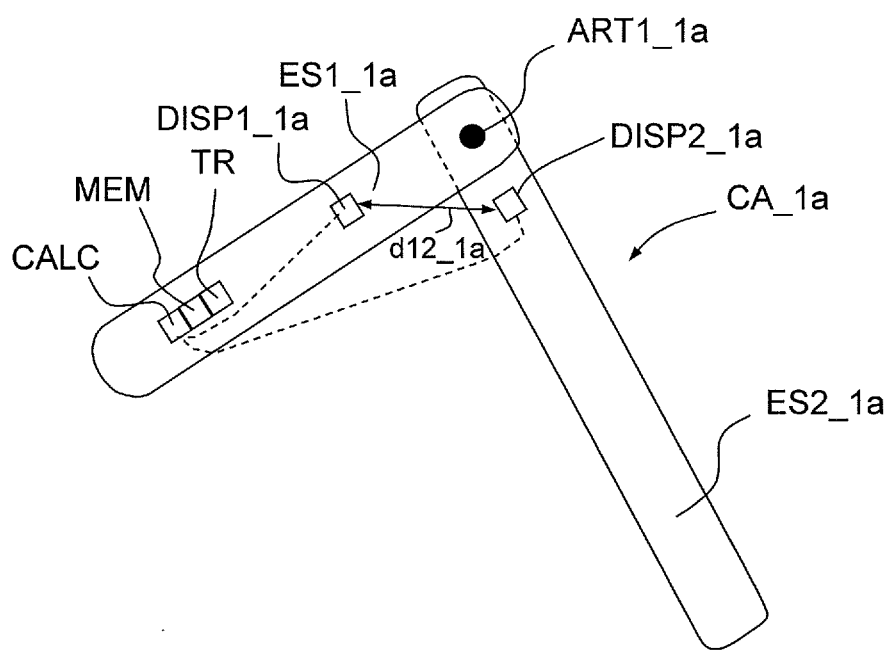
FIG. 1a illustrates schematically another embodiment of a system according to one aspect of the invention.

As illustrated in comparison on the system of FIG. 1a, in which an articulated chain comprises two solid elements, in this instance solid segments ES1_1a and ES2_1a, and a first articulation ART1_1a with one degree of freedom. The calculation module CALC, storage module MEM and transmission module TR are identical and therefore referenced in the same way. In FIG. 1a, the two devices DISP1_1a and DISP2_1a are placed close to the articulation ART_1a.

Also, for a measurement uncertainty that is considered identical, if the devices DISP1_1 and DISP2_1 of FIG. 1 are identical to the devices DISP1_1a and DISP2_1a of FIG. 1a, the error in the distance d12_1a of FIG. 1a is the same as that in the distance d12_1 of FIG. 1. However, this error with the same value in the distances d12_1a of FIG. 1a and d12_1 of FIG. 1 implies a greater corresponding angular error in the case of FIG. 1a, because the devices DISP1_1a and DISP2_1a are placed close to the articulation ART_1a, in comparison with the corresponding angular error in the case of FIG. 1.

As a variant, if the articulation ART1_1 had two degrees of freedom, two inter-device distance measuring devices would be placed on each of the solid elements ES1_1 and ES1_2 so that the articulation ART1_1, and the two devices of one and the same solid element, are not in line. This variant applies to any articulation with two degrees of angular freedom of any articulated chain.

As a variant, if the articulation ART1_1 had three degrees of freedom, three inter-device distance measuring devices would be placed on each of the solid elements ES1_1 and ES1_2 so that the articulation ART1_1, and the three devices of one and the same solid element, are not coplanar. This variant applies to any articulation with three degrees of freedom of any articulated chain.

In general, an articulation of the human body, such as a knee or an elbow, is considered to be an articulation with one degree of freedom, and more rarely as an articulation with 2 degrees of freedom.

Figure 2:
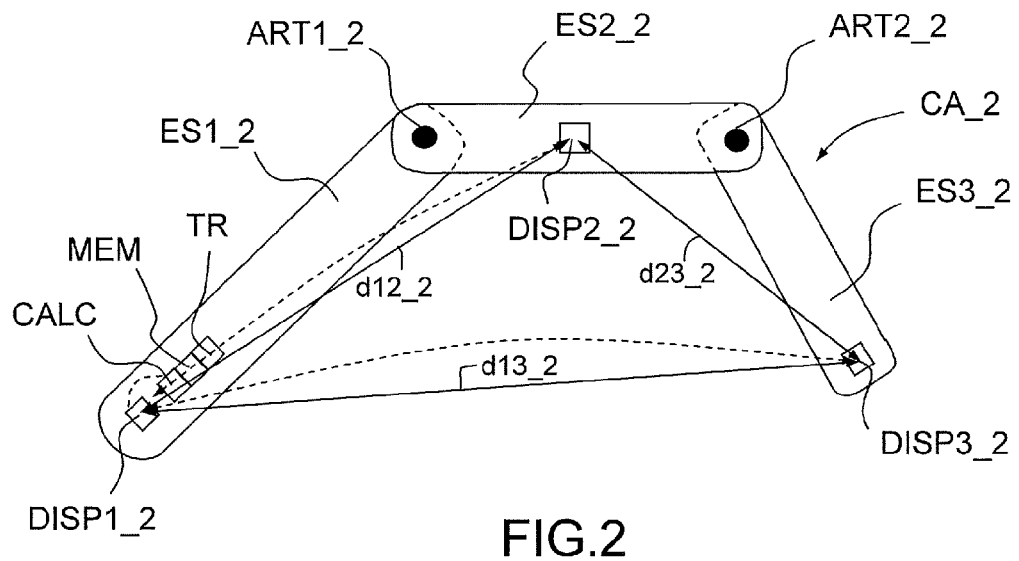
FIG. 2 illustrates schematically another embodiment according to one aspect of the invention.

FIG. 2 shows a second articulated chain CA_2 furnished with an autonomous system for determining items of information representative of the movement of the articulated chain CA_2, according to one aspect of the invention. The second articulated chain CA_2 comprises three solid elements, in this instance solid segments ES1_2, ES2_2 and ES3_2, and a first articulation ART1_2 and a second articulation ART2_2 with one degree of freedom. As a variant, the solid elements of the articulated chain may be of any shape.

In the second articulated chain CA_2, the first solid element ES1_2 comprises a first inter-device distance measuring device DISP1_2, the second solid element ES2_2 comprises a second inter-device distance measuring device DISP2_2 and the third solid element ES3_2 comprises a third inter-device distance measuring device DISP3_2. Therefore the system makes it possible to determine the distances d12_2, d13_2 and d23_2 separating respectively the first and second devices DISP 1_2 and DISP2_2, the first and third devices DISP 1_2 and DISP3_2, and the second and third devices DISP 2_2 and DISP3_2.

These distances d12_2, d13_2 and d23_2 are delivered by one of the two or by both, for example by wireless transmission, to a calculation module CALC that may be placed on the second articulated chain CA_2. The calculation module CALC is capable of calculating items of information representative of the movement of the second articulated chain CA_2, based on measurements transmitted by the inter-device distance measuring devices DISP1_2, DISP2_2 and DISP3_2.

These items of information can be stored in a storage module MEM and transmitted by a transmission module TR, either substantially in real time, or after the end of a movement of the second articulated chain CA_2, for example to an external electronic control unit capable, based on these items of information, of reconstructing or determining the movement of the second articulated chain CA_2. In the case of a human or of a humanoid robot, the post-processing carried out can incorporate a model making it possible to detect the placement of the feet and therefore the overall movement of a person or of a humanoid robot who or which walks or runs.

In the example of FIG. 2, the three devices DISP1_2, DISP2_2 and DISP3_2 are placed so that the sum, for all of the devices DISP1_2, DISP2_2 and DISP3_2, of the distances separating a device DISP1_2, DISP2_2, DISP3_2 of the articulation or of the articulations ART1_2, ART2_2 linked to the solid element ES1_2, ES2_2, ES3_2 on which the device DISP1_2, DISP2_2, DISP3_2 is mounted, is maximal.

In a variant already evoked in a general manner above, if the articulations ART1_2 and ART2_2 were to have two degrees of freedom, two inter-device distance measuring devices would be placed on each of the solid elements ES1_2, ES2_2 and ES3_2, so that an articulation ART1_2 or ART2_2, and the two devices of one and the same solid element linked to the articulation, are not in line.

In another variant already evoked in a general manner above, if the articulations ART1_2 and ART2_2 were to have three degrees of freedom, three inter-device distance measuring devices would be placed on each of the solid elements ES1_2, ES2_2 and ES3_2, so that the articulation ART1_2 or ART2_2, and the three devices of one and the same solid element linked to the articulation, are not coplanar.

Figure 3:
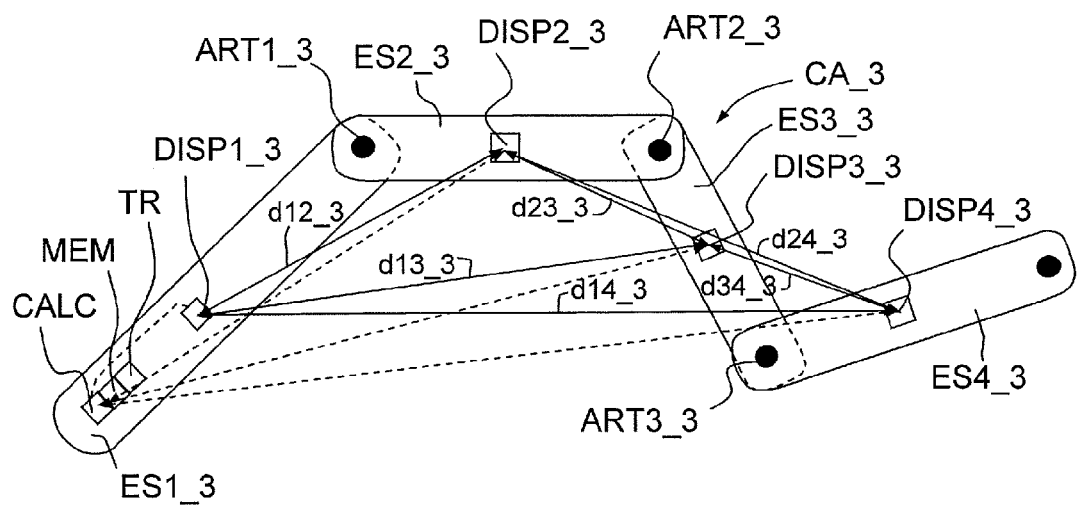
FIG. 3 illustrates schematically another embodiment according to one aspect of the invention.

FIG. 3 shows an embodiment of a system according to one aspect of the invention, in which a third articulated chain CA_3 comprises four solid elements ES1_3, ES2_3, ES3_3 and ES4_3, linked in this order via articulations ART1_3, ART2_3 and ART3_3 with one degree of freedom.

The solid elements of the articulated chain may be of any shape.

In the third articulated chain CA_3, the first solid element ES1_3 comprises a first measuring device DISP1_3, the second solid element ES2_3 comprises a second inter-device distance measuring device DISP2_3, the third solid element ES3_3 comprises a third inter-device distance measuring device DISP3_3 and the fourth solid element ES4_3 comprises a fourth inter-device distance measuring device DISP4_3. Therefore the system makes it possible to determine the distances d12_3, d13_3, d14_3, d23_3, d24_3 and d34_3 separating respectively the first and second devices DISP1_3 and DISP2_3, the first and third devices DISP1_3 and DISP3_3, the first and fourth devices DISP1_3 and DISP4_3, the second and third devices DISP2_3 and DISP3_3, the second and fourth devices DISP2_3 and DISP4_3, and the third and fourth devices DISP3_3 and DISP4_3.

These distances d12_3, d13_3, d14_3, d23_3, d24_3 and d34_3 are delivered by one of the two or both devices concerned, for example by wireless transmission, to a calculation module CALC placed on the third articulated chain CA_3. The calculation module CALC is capable of calculating items of information representative of the movement of the third articulated chain CA_3, based on the measurements transmitted by the inter-device distance measuring devices DISP1_3, DISP2_3, DISP3_3 and DISP4_3.

These items of information can be stored in a storage module MEM and transmitted by a transmission module TR, either substantially in real time, or after the end of a movement of the third articulated chain CA_3, for example to an external electronic control unit capable, based on these items of information, of reconstructing or determining the movement of the third articulated chain CA_3. In the case of a human or of a humanoid robot, the post-processing carried out may incorporate a model making it possible to detect the placement of the feet and therefore the overall movement of a person or of a humanoid robot who or which walks or runs.

In the example of FIG. 3, the four devices DISP1_3, DISP2_3, DISP3_3 and DISP4_3 are respectively placed substantially in the middle of the solid elements ES1_3, ES2_3, ES3_3 and ES4_3. As a variant, the devices DISP1_3 and DISP4_3 can be placed at the distal ends of the articulations ART1_3 and ART3_3.

It will be noted that, in all the aforementioned exemplary embodiments, the distance separating two inter-device distance measuring devices can be determined by distance-determination means distinct from the measuring devices. These distance-determination means then use measurements supplied by at least one of the measuring devices. These distance-determination means can therefore be remote from the measuring devices. These distance-determination means can be placed on the articulated chain or at a distance from the latter.

For an articulated chain comprising at least one measuring device per solid element of the articulated chain and per degree of freedom in rotation of an articulation linked to the solid element, said measuring devices are placed on the solid element so that the vector linking the articulation to a device is linearly independent of the vector or vectors linking the articulation to the other measuring devices.

It is also possible to consider that an articulation has not only up to three degrees of freedom in rotation, but also up to three degrees of freedom in translation.

For an articulated chain with no closed portion, and comprising at least one inter-device distance measuring device per solid element of the articulated chain and per degree of freedom in rotation or in translation, of an articulation linked to the solid element, the measuring devices are placed on the solid element so that the following relation is verified:
NEQ≥NVAR wherein:

NEQ represents the number of equations linking to the distance measurements the unknown position variables of the end of each segment moved by an articulation of the articulated chain; and NVAR represents the number of said unknown position variables.

The number of geometric relations NEQ can be written in the form:

$$NEQ = \sum_{i=1}^{NCAPT-1} i,$$

NCAPT being the total number of measuring devices present on the articulated chain. Moreover, the number NVAR of variables of positions to be determined can be written in the form:

$$NVAR = \sum_{j=1}^{NA} NDDL_j,$$

NA being the number of articulations of the articulated chain, and $NDDL_j$ being the number of degrees of freedom of each articulation. The number of degrees of freedom of an articulation ranges from one to six, i.e. up to three in rotation and three in translation.

In the particular case for which NEQ=NVAR, it is possible to have several possible solutions, and to easily determine which is the right one. When NEQ>NVAR, a single solution is determined for reconstructing the position of the articulated chain.

In all of the embodiments cited, it is possible to take account, in the reconstruction of the movement of the articulated chain by the external electronic control unit, based on the items of information representative of the movement of the articulated chain generated by the calculation module CALC and transmitted by the transmission module TR, of only the inter-device distances separating two devices linked to respective solid elements linked by an articulation, as illustrated in FIGS. 4a, 4b and 4c.

FIG. 4a illustrates distances measured or determined based on measurements supplied by inter-device distance measuring devices placed on a human or a humanoid robot.

FIG. 4b illustrates the items of information calculated by the calculation module CALC which are used by the external electronic control unit, or in other embodiments directly by the calculation module CALC, to use with a Kalman filter, an optimization or a neural network, to reconstruct the movement of the articulated chain.

The states defining the posture or the placement of the articulated chain are advantageously the coordinates defining the rotation of the articulation, such as the Euler, cardan angles or the quaternions. The positions Pr=(prx,pry,prz) of the devices must be measured or estimated for a known or reference posture of the articulated chain. The coordinates of the devices are then written as a function of the rotations of the articulations P=MPr=(px,py,pz), M being the rotation matrix, variable, making it possible to move from the reference posture to the posture to be estimated (there is one matrix per solid element). The inter-device distances are linked to the positions by the relation: $d12^2=(px1-px2)^2+(py1-py2)^2+(pz1-pz2)^2$. Knowing the inter-device distances, the inversion of each matrix M can use knowledge concerning the number of degrees of freedom of each articulation, and concerning the articular abutments such as the angle of the elbow varies by only 180°. That can help the inversion, for example by accelerating the convergence or by making it possible to minimize the number of sensors. Once the posture has been estimated, in the form of a set of angles, it is possible if necessary to deduce therefrom the coordinates of any point of the articulated chain.

The states defining a posture can be the positions of the devices or of certain particular points of the solid elements (but then the knowledge of the articulated structure is not necessarily used). In this case, these positions are estimated based on the distances, for example by triangulation. Based on these estimated positions, the overall posture of the articulated chain is then determined, for example by taking account of knowledge concerning the number of degrees of freedom and the articular abutments.

Finally, FIG. 4c illustrates the reconstruction of the movement, displayed virtually by means of a graphic representation in which the body, considered to be an articulated chain, is divided into a set of solid elements articulated relative to one another.

All of the solid elements can, for example, be represented as shown in FIG. 4c, as a head TE, a neck C, a set of trunk elements T1, T2, T3, a set of left arm elements BG1, BG2, BG3, BG4, a set of right arm elements BD1, BD2, BD3, BD4, a set of left leg elements JG1, JG2, LG3, JG4, JG5, and a set of right leg elements JD1, JD2, JD3, JD4, JD5.

The external electronic control unit can, based on the items of information supplied by the calculation module CALC, reconstruct and simulate visually the movement of the articulated chain, by deducing the angles between the various solid elements of the articulated chain.

In the case of the human body, the shoulder, as well as the hip, is often considered to be an articulation with three degrees of freedom, and the elbow, as well as the knee, to be an articulation with one degree of freedom. Also, it is of value to place at least three or four devices on the torso, and three or four on the hips, well distributed so as to maximize the inter-device distances and the distances between the devices and the articulations, and to place one device in the middle of the arm between the shoulder and the elbow, in the middle of the thigh, at the wrist and at the ankle.

The present invention makes it possible, at reduced cost, to propose an autonomous system for determining items of information representative of the movement of an articulated chain.

What is claimed is:

1. An autonomous system for determining items of information representative of the movement of an articulated chain comprising at least two solid elements and at least one articulation connecting said two elements, said system being characterized in that it comprises:
   at least two devices for measuring inter-device distances between the at least two devices, mounted fixedly each on a respective distinct element of said articulated chain and suitable for transmitting the measurements made;
   means for determining at least one distance separating the at least two measuring devices based on at least one measurement supplied by at least one of the two measuring devices; and
   calculation means, suitable for calculating items of information representative of the movement of said articulated chain based on the distances transmitted by said distance-determination means.

2. The system as claimed in claim 1, wherein said distance-determination means and said calculation means are mounted on said articulated chain.

3. The system as claimed in one of claim 1, wherein at least one of said devices for measuring inter-device distances is suitable for emitting and/or receiving data.

4. The system as claimed in any one of claim 1, also comprising at least one accelerometer and/or one gyrometer and/or one magnetometer supplying complementary measurements used by the calculation means.

5. The system as claimed in one of claim 1, comprising at least one optical device for measuring inter-device distances.

6. The system as claimed in one of claim 1, comprising storage means, mounted on said articulated chain, suitable for storing said items of information representative of the movement of said articulated chain delivered by said calculation means, or for directly storing said at least one distance.

7. The system as claimed in one of claim 1, wherein said measuring devices are mounted on said solid elements of said articulated chain so that, for at least one articulation, the sum, for all of said measuring devices mounted on a solid element linked to said articulation, of the distances separating a measuring device and the articulation, is maximal.

8. The system as claimed in one of claim 1, wherein said measuring devices are mounted on said solid elements of said articulated chain so that the distances between devices placed on one and the same solid element are maximal.

9. The system as claimed in one of claim 1, wherein said articulated chain comprises a solid element linked to two articulations, at least one measuring device being placed substantially in the middle of said solid element.

10. The system as claimed in one of claim 1, comprising at least one measuring device per solid element of the articulated chain and per degree of freedom of an articulation linked to the solid element, said chain having no closed portion, said measuring devices being placed on the solid element so that the following relation is verified: NEQ≤NVAR,
wherein:
NEQ represents the number of equations linking to the distance measurements the unknown position variables of the end of each segment moved by an articulation of the articulated chain; and
NVAR represents the number of said unknown position variables.

11. The system as claimed in claim 10, comprising at least one solid element linked to an articulation furnished with at least two measuring devices, said measuring devices being placed on said solid element so that they avoid forming a straight line with the articulation.

12. The system as claimed in claim 10, comprising at least one solid element linked to an articulation and furnished with at least three measuring devices, said measuring devices being placed on said solid element so that they avoid forming a plane with the articulation.

13. The system as claimed in one of claim 1, comprising at least one measuring device per solid element of the articulated chain and per degree of freedom in rotation of an articulation linked to the solid element, said measuring devices are placed on the solid element so that the vector linking the articulation to a device is linearly independent of the vector or vectors linking the articulation to the other measuring devices.

14. The system as claimed claim 1, wherein said measuring devices comprise a measurable maximal threshold distance.

15. The system as claimed in claim 1, also comprising transmission means (TR) mounted on said articulated chain in order to transmit items of information representative of the movement of said articulated chain or of the determined inter-device distances stored in said storage means.

16. The system as claimed in claim 1, wherein said measuring devices and/or said calculation means, and/or said storage means, and/or said transmission means are suitable for operating on a living body considered to be said articulated chain.

17. A method for determining items of information representative of the movement of an articulated chain comprising at least two solid elements and at least one articulation linking said two elements, characterized in that it comprises the following steps:
fixedly mounting at least two distance-measuring devices each on a respective distinct solid element of the articulated chain;
determining at least one distance based on at least one measurement supplied by at least one of the two distance-measuring devices; and
calculating items of information representative of the movement of said articulated chain based on the previously-determined distances.

* * * * *